United States Patent [19]

Leder

[11] 3,789,225

[45] Jan. 29, 1974

[54] PROCESS FOR PREPARING GLASSY LIQUID CRYSTALS AND METHOD FOR FORMING IMAGES ON SAME

[75] Inventor: Lewis B. Leder, Rochester, N.Y.

[73] Assignee: Xerox Corporation, Stamford, Conn.

[22] Filed: Aug. 24, 1971

[21] Appl. No.: 174,348

[52] U.S. Cl. ............ 250/331, 23/230 LC, 250/372, 350/160 LC
[51] Int. Cl. .............................................. G01t 1/16
[58] Field of Search .............. 250/65, 83 R, 83 CD; 350/160 LC, 157; 23/230 LC

[56] References Cited
UNITED STATES PATENTS

| | | | |
|---|---|---|---|
| 3,666,947 | 5/1972 | Haas | 350/160 LC |
| 3,594,126 | 7/1971 | Fergason | 23/230 LC |
| 3,655,971 | 4/1972 | Haas | 250/65 |
| 3,666,947 | 5/1972 | Haas | 250/83 |

*Primary Examiner*—James W. Lawrence
*Assistant Examiner*—D. C. Nelms
*Attorney, Agent, or Firm*—James J. Ralabate et al.

[57] ABSTRACT

A process for preparing various glassy optically negative liquid crystalline materials and a method for forming images on these materials are described. The glassy liquid crystals are relatively hard films which retain the optical properties of the normally softer liquid crystalline compositions. These liquid crystalline materials are imaged by flash exposure to a burst of imagewise activating radiation followed by relatively rapid cooling. The heat from the energy of the activating radiation typically causes a change in the pitch of the liquid crystal in the exposed areas of the film and the new pitch is retained by the rapid cooling.

22 Claims, 3 Drawing Figures

PATENTED JAN 29 1974  3,789,225

INVENTOR
LEWIS B. LEDER

BY J. D. Maccarone

ATTORNEY

PROCESS FOR PREPARING GLASSY LIQUID CRYSTALS AND METHOD FOR FORMING IMAGES ON SAME

BACKGROUND OF THE INVENTION

This invention relates to a novel process for forming optically negative liquid crystalline films and to a method for forming images on these films.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these structures is well-known in the liquid crystal art.

Cholesteric liquid crystalline substances have been found to be useful in many applications because of their unique optical activity characteristics. The molecules in cholesteric liquid crystals are arranged in very thin layers with the long axes of the molecules parallel to each other and to the plane of the layers within each layer. Because of this configuration of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals can be found in Gray, G.W., Molecular Structure and The Properties of Liquid Crystals, Academic Press, 1962.

It is known that the pitch, or repetition distance of the helical structure, of cholesteric liquid crystals is sensitive or responsive to various foreign stimuli such as heat, pressure, shear, chemical vapors, and electric and magnetic fields. These characteristics have proved to be very advantageous and cholesteric liquid crystalline substances can be used for a variety of purposes typical of which is a system for detecting physical and/or electrical conductivity characteristics in a surface of interest such as is disclosed in copending application Ser. No. 104,344, filed Jan. 6, 1971. Nevertheless, in some instances, it would be desirable to have cholesteric liquid crystalline substances whose performance in a particular mode is not substantially affected by the presence of foreign stimuli.

Cholesteric liquid crystals have also been found to be useful in imaging systems. Imaging systems utilizing cholesteric liquid crystalline substances are described in copending applications Ser. No. 867,593, filed Oct. 20, 1969, now U.S. Pat. No. 3,642,348 and Ser. No. 821,565, filed May 5, 1969, now U.S. Pat. No. 3,652,148 respectively. In new and growing areas of technology such as liquid crystalline imaging systems, new methods, apparatus, compositions and articles of manufacture are often discovered for the application of the new technology in a new mode.

The present invention relates to a process for forming glassy cholesteric liquid crystalline substances and further to an advantageous method for forming images on such a liquid crystalline imaging member.

SUMMARY OF THE INVENTION

It is, therefore, an object of this invention to provide the above-mentioned desirable features.

IT is another object of the invention to provide a process for preparing relatively hard cholesteric liquid crystalline materials.

It is a further object of the invention to provide a process for preparing cholesteric liquid crystalline materials which are substantially non-fluid.

It is still another object of the invention to provide relatively more stable cholesteric liquid crystalline materials.

Another object of the invention is to provide cholesteric liquid crystalline materials having simplified physical handling characteristics.

It is still another object of the invention to provide a method for forming images on glassy cholesteric liquid crystal films.

A further object of the invention is to provide a method for changing the pitch of glassy cholesteric liquid crystal films.

Yet another object of the invention is to provide a method for imaging glassy cholesteric liquid crystal films which utilizes ultra-violet light.

The foregoing and other objects and advantages are realized in accordance with the invention by providing a novel and advantageous process for preparing various glassy cholesteric liquid crystalline materials and further by providing a flash imaging method whereby images may be conveniently formed on these novel materials.

The process of preparing glassy cholesteric liquid crystal materials comprises, generally speaking, heating the cholesteric liquid crystalline substance above its isotropic transition temperature, cooling the substance to some critical temperature within the cholesteric mesomorphic range, disturbing the substance while it is at this critical temperature and subsequently cooling the substance at a relatively rapid rate until it obtains a glassy, or substantially solid state.

Relatively thin films of these glassy cholesteric liquid crystalline materials are imaged by flash exposure to a very short burst of activating radiation in imagewise fashion. Typically, the pitch of the liquid crystalline material in the exposed areas of the film is caused to change and the new pitch is retained by relatively rapid cooling of the liquid crystal film. The imaging method provides a tendency to form clear images on a colored background as will be discussed in detail hereinafter.

The invention will be more readily understood and appreciated from the following detailed description of various preferred embodiments thereof particularly when read in conjunction with the accompanying drawings wherein.

As has been previously discussed, liquid crystalline substances are normally fluid or at least semi-fluid and further they exist in their liquid crystalline mesophase in some specific temperature range which may be at, above, or below room temperature. It is well-known that when liquid crystalline substances are cooled below their mesomorphic temperature range they recrystallize and no longer posses liquid crystalline characteristics. It should be understood that when the term "glassy cholesteric liquid crystal" is used herein throughout the specification and in the claims it is meant to indicate those solidified liquid crystalline materials which have retained the ordering of the cholesteric state in the solid form.

Figure 1:
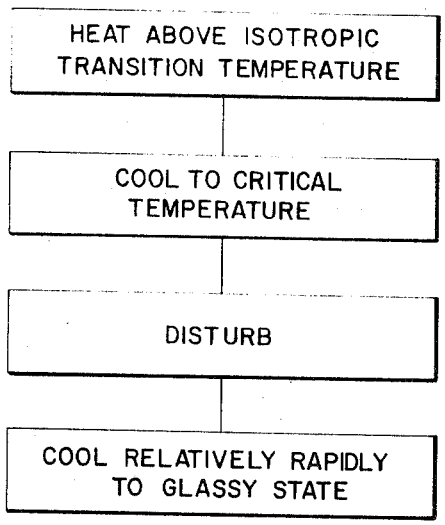
FIG. 1 is a flow chart showing the individual steps of the novel process of the invention.

Referring now to FIG. 1 the process steps of the process for preparing glassy cholesteric liquid crystals are shown in the form of a flow diagram. Initially the cholesteric liquid crystalline substance is heated to a temperature above the isotropic transition temperature of the substance, i.e., the point at which the substance becomes a true isotropic liquid. This heating step may be carried out by any of various methods. Typically, a thin film or a particulate layer of the liquid crystalline substance is spread on some suitable substrate, e.g., a glass slide, which is then placed on a hot plate.

The liquid substance is then allowed to cool to some critical temperature within its mesomorphic temperature range, i.e., the temperature range over which the substance possesses the cholesteric liquid crystalline structure. This is typically accomplished by removing the source of heat used in the initial proces step and allowing the substance to stand in air. Generally a time period of up to about 2–5 minutes is sufficient to cool the substance to the desired temperature. It will be recognized that the critical temperature may be any which is within the temperature range in which the substance is in the cholesteric mesomorphic phase. Thus, the critical temperature may be chosen with respect to some desired color since, for normal viewing, the cholesteric liquid crystal substance exhibits various colors as the temperature of the substance changes. This is so because, as is well-known, $\lambda$ for any cholesteric liquid crystalline substance, i.e., the center wavelength of the wavelength band reflected by the substance, is equal to $2\ np$ (where $n$ is the refractive index of the substance and $p$ is the pitch) and the pitch is responsive to and changes with the change in temperature. Of course, the light reflected by the cholesteric liquid crystalline film will only be visible to the eye when $\lambda$ is in the visible region of the spectrum. Where the $\lambda$ value of the substance is not in the visible region the film will typically appear to be colorless. It will be obvious to those skilled in the art that the critical temperature to which the substance is cooled will vary with different cholesteric liquid crystalline substances since different substances are in the cholesteric mesomorphic state at varying temperatures.

When the cholesteric liquid crystalline substance is at the desired critical temperature it is then "disturbed." By "disturbing" the liquid crystal is meant exerting some external stimulus thereto, which may be a mechanical or electrical force, in order to change the substance from the focal-conic or "undisturbed" texture to the Grandjean or "disturbed" texture.

Typically, most cholesteric liquid crystalline substances will cool to the focal-conic state unless disturbed by some means.

The focal-conic texture state is predominantly characterized by its highly diffuse light scattering appearance caused by a distribution of small, birefringent domains. This texture has no single optic axis. The Grandjean texture is typically characterized by the selective reflection of incident light, at normal incidence, around a central wavelength $\lambda$ where $\lambda = 2\ np$ as has been previously discussed. The Grandjean state is additionally characterized by optical activity for wavelengths of light away from $\lambda$, i.e. the plane of polarization of these wavelengths is rotated by some angle as they are transmitted. Where $\lambda$ is in the visible spectrum the liquid crystalline composition film appears to have the color corresponding to $\lambda$. The Grandjean texture is sometimes referred to as the "disturbed" texture state.

Generally, therefore, the liquid crystalline substance may be disturbed by any means suitable for changing the substance from the focal-conic texture state to the Grandjean texture state including those which are presently known as well as those which may be discovered in the future. Presently known suitable methods by which the liquid crystalline substance can be disturbed include applying a shearing force to the surface of the liquid crystal film such as by sliding a glass plate across the surface thereof, mechanical vibration, high frequency ultrasonic vibration and, for appropriate cholesteric substances, applying an electric field thereto.

By disturbing the cholesteric liquid crystalline substance at the critical temperature it is theorized that the optical properties unique to the cholesteric state are thus retained in the substance when it is subsequently cooled. It is essential that the liquid crystalline substance be disturbed at the critical temperature for if this process step is carried out before the substance obtains the cholesteric mesomorphic state the desired optical properties will not be incorporated into the final product, and if done at a temperature below the cholesteric mesomorphic temperature range the substance will have crystallized and have lost its liquid crystalline properties.

The liquid crystalline substance is then cooled relatively rapidly until it adopts the glassy, or hard, form. This typically is accomplished by placing the substrate carrying the liquid crystal film on a cool surface and allowing it to stand in air until it becomes glassy. Of course, it will be obvious that the heating-disturbing-cooling cycle can also be carried out mechanically by utilizing temperature-controlled chambers and automatic disturbance devices.

The glassy cholesteric liquid crystalline materials made according to the advantageous process of the invention are stable at room temperature over long periods of time, e.g., up to a year or more and are not substantially affected by the presence of foreign stimuli. Thin films of these glassy liquid crystals can be utilized as imaging members and images formed thereon as will be described in detail hereinbelow. Further these materials can be reprocessed according to the process described above thus providing reusable materials. Of course if the glassy liquid crystals are heated and subsequently allowed to cool to room temperature without being disturbed at a critical temperature they will crystallize and no longer posses any liquid crystalline properties.

The above-described process may be practiced with any suitable cholesteric liquid crystalline substance, mixtures thereof or compositions having cholesteric liquid crystalline properties which will adopt the glassy state. Typically suitable cholesteric liquid crystalline materials include esters derived from reactions of cholesterol and carboxylic acids such as cholesteryl crotonate, cholesteryl benzoate, cholesteryl acrylate, 6-nitrocholesteryl benzoate, 6-nitrocholesteryl acetate, cholesteryl cinnamate, cholesteryl anisoate and cholesteryl acetoacetate; dicholesteryl compounds such as dicholesteryl carbonate; and double or triple bonded carbonates of cholesterol such as cholesteryl propynly carbonate. Typical suitable mixtures which have been found to adopt the glassy state when treated in accordance with the process of the invention include, for example, dicholesteryl carbonate and cholesteryl benzoate; dicholesteryl carbonate and cholesterol; dicholesteryl carbonate and cholesteryl anisoate; dicholesteryl carbonate and cholesteryl propynyl carbonate; dicholesteryl carbonate and cholesteryl chloride; dicholesteryl carbonate, cholesteryl anisoate and cholesteryl benzoate; p-nitro cholesteryl benzoate and cholesteryl propynyl carbonate; p-nitro cholesteryl acetate and cholesteryl benzoate; p-nitro cholesteryl acetate, cholesteryl cinnamate and cholesteryl; cholesteryl acetoacetate and cholesteryl cinnamate; cholesteryl anisoate and cholesteryl crotonate, cholesteryl anisoate and cholesterol; and cholesteryl cinnamate and cholesterol.

Variations of the basic process described above are possible. According to one embodiment small amounts of other cholesteric liquid crystalline substances can be added to the substance being processed in order to achieve some desired and result such as color or texture. Preferably such additives should have a large supercooling range since if the additive materials crystallize too rapidly they will tend to promote relatively rapid crystallization of the primary cholesteric liquid crystalline substance with a resultant loss of liquid crystalline properties for the latter. According to another embodiment carbon black particles may be added to the cholesteric liquid crystalline substance or mixture before processing. The carbon black particles increase the efficiency of the heating process step since carbon black typically absorbs heat more efficiently than the liquid crystalline materials and in turn transfers heat to the liquid crystal thus promoting uniform heating of the substance. Additionally, added color contrast can be obtained through the use of carbon black.

According to another preferred embodiment the quality of the glassy liquid crystal film can be improved by exposing the film to a short burst of energy such as that provided by a Xenon flash lamp and other gas-filled flash lamps providing ultraviolet wavelengths which can be absorbed and cause rapid heating of the film. At a relatively high power level, e.g., several joules in about 30 microseconds, rapid heating and cooling of the glassy liquid crystal film occurs and tends to result in a smoother, more uniform film surface.

Figure 2:
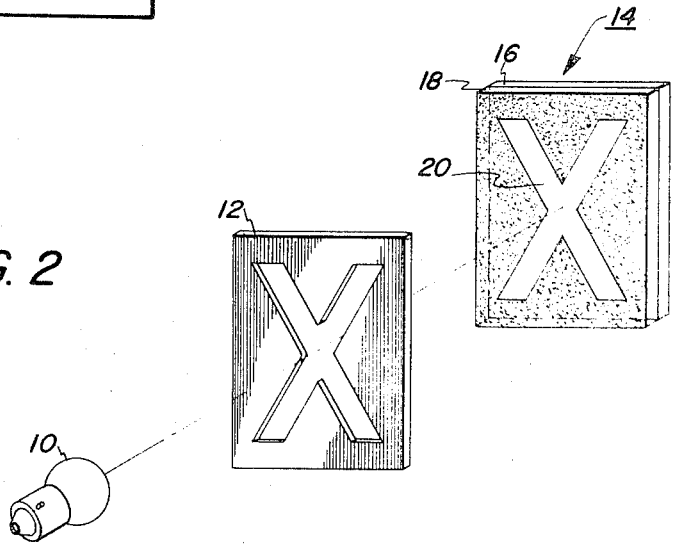
FIG. 2 is a schematic illustration of the practice of an embodiment of the imaging method of the invention; and, FIG. 3 shows the absorption edges of the absorption spectra of a typical cholesteric liquid crystalline substance and other materials.

The glassy cholesteric liquid crystalline films of the invention can be utilized as imaging members according to the flash imaging method of the invention. FIG. 2 illustrates a typical embodiment of the practice of the novel and advantageous flash imaging method for forming images on glassy cholesteric liquid crystals. Referring now to FIG. 2 there is seen a high energy power source 10, information-bearing member 12 and an imaging member, generally designated 14, comprising substrate 16 and glassy cholesteric liquid crystalline film 18. The spatial configurations of the elements utilized in the imaging method are for the purposes of illustration only.

According to the flash imaging method, imaging member 14 is exposed to an imagewise burst of activating radiation by directing activating radiation from energy source 10 through an information-bearing member 12. An image 20 is thereby formed on the glassy liquid crystalline film 18 which typically will be a clear image on colored background areas. Alternately, by appropriate energy control an image of one color can be achieved on a background of the original color of the film.

The glassy cholesteric lqiuid crystalline film 18, typically from about 1 to about 10 mils in thickness, which can be any prepared by the process described herein above, is preferably arranged on a substrate 16 which may be any suitable material, transparent or opaque. The substrate 16 functions as a support member for the glassy liquid crystal film and thus may be comprised of any suitable material having the necessary physical properties required for this purpose, such as for example, glass plates, metal sheets such as aluminum or the like, etc. Where the substrate is transparent to activating radiation exposure may be carried out from either side of the imaging member; of course, where the substrate material is opaque then exposure would have to be made from the liquid crystal film side of the imaging member as is illustrated.

When glassy cholesteric liquid crsytalline films of the type described hereinabove are normally heated they do not cool back to the original highly colored state but instead change appearance due to crystallization. Crystallization results because the cooling times involved are sufficiently long to permit this process to occur. However, when flash imaging of such glassy films is carried out by any means whereby the exposed areas of the films are heated very quickly the pitch of the liquid crystalline material in the exposed areas is changed and the relatively rapid cooling retains the new pitch (and/or color). The changes in the exposed areas are typically exhibited as a change in reflectivity or transmission or a change in color. Typically, the pitch of the liquid crystalline material in the exposed areas becomes smaller thus causing λ to be shifted toward the ultraviolet region of the electromagnetic spectrum. Therefore, the flash imaging method has a tendency to form relatively clear images on a colored background. Alternatively, if sufficient energy is directed upon the film, the exposed areas thereof could be heated above the isotropic transition temperature of the material. Typically, these areas would crystallize upon cooling thereby losing their liquid crystalline characteristics. Thus, this procedure would also form clear images on a colored background.

Figure 3:
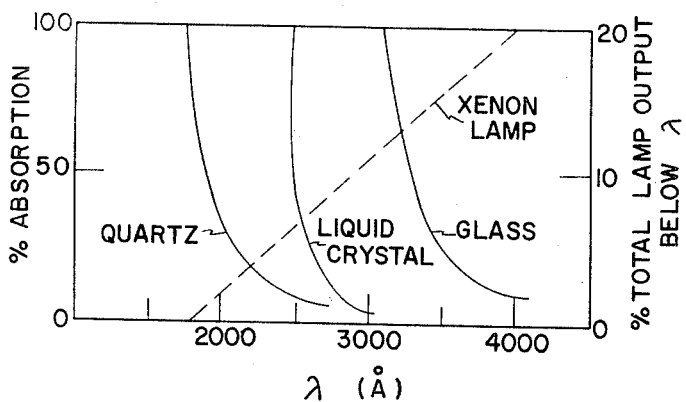

Any suitable energy source which is capable of heating the cholesteric liquid crystalline material quickly may be utilized in the flash imaging method. Typical suitable energy sources include, for example, a Xenon flash lamp and other gas-filled flash lamps which provide ultraviolet wavelengths which can be absorbed by the cholesteric liquid crystalline materials and thus cause rapid heating thereof. It has been found that for typical cholesteric liquid crystalline substances there is essentially no absorption of light at wavelengths longer than about 2,500 A. However, at about 2,500 A and below there is strong absorption of light. Since a quartz envelope Xenon flash lamp has emission below 2,500 A this component of the light is essentially totally absorbed by the glassy cholesteric liquid crystal film thereby typically causing a change in the pitch of liquid crystal material as well as a general smoothening of the film surface due to uniform heating and cooling. That ultraviolet absorption causes the typical pitch change in the glassy cholesteric liquid crystal film according to the imaging method has been demonstrated experimentally by alternately placing a quartz plate and a glass plate over the film while exposing it to a burst of energy from a Xenon flash lamp. The absorption edges for glass and quartz relative to that of a typical cholesteric liquid crystal material, in this case, cholesteryl cinnamate, are shown in FIG. 3. Thus, it can be seen that the glass plate nullifies the imaging effect described above since it absorbs the ultraviolet radiation while the quartz plate does not alter the effect since it does not substantially absorb radiation of wavelengths which the liquid crystal substance absorbs.

It has been found that a burst of energy of approximately 1 joule/cm$^2$ in about 50 to 100 microseconds from a Xenon flash lamp is adequate to heat a glassy liquid crystal film sufficiently to cause imaging to occur. The distance which the energy source must be positioned from the film for imaging to occur will, of course, be depedent upon the source energy. Of course, it will be recognized that only a small portion of the energy from a Xenon flash lamp is activating, specifically that portion which is typically of a wavelength of about 2,500 A or less. There is also seen in FIG. 3 a plot of the total Xenon flash lamp output which is below the particular wavelengths indicated.

In a preferred embodiment of the flash imaging method the glassy liquid crystalline film 18 has carbon black particles incorporated therein. Since carbon black absorbs radiation over a wide range of wavelengths, as has been discussed previously, the incorporation of such particles in the film increases the efficiency of the imaging method and further provides a wider latitude of choice with respect to the energy sources which can be employed. The carbon black particles also provide a more contrasting image with respect to the background areas. Thus where carbon black is present in the liquid crystal film an energy source other than one which provides ultraviolet wavelengths can be used in the practice of the flash imaging method since the carbon black particles will absorb the wavelengths of radiation outside of the ultraviolet region and transfer heat to the liquid crystal thereby causing imaging to be effected. Moreover where an energy source which provides an output containing wavelengths of radiation within the ultraviolet region as well as outside of this region, e.g., a Xenon flash lamp, is employed to effect imaging the presence of the carbon black in the liquid crystal film will result in a more efficient method since substantially all of the output from the energy source will be utilized.

Information-bearing member 12 can be any suitable member which will allow activating radiation to reach the glassy liquid crystalline film in imagewise fashion. Typical suitable members include, for example, stencil type imaging masks, e.g., a solid sheet with open areas, transparent materials such as quartz plates having information printed thereon such as by photoresist techniques, and the like.

The images formed on imaging members by the flash imaging method can be employed as masters for making large numbers of copies thereof such as by the well-known xerographic copying technique. The images formed according to the flash imaging method described hereinabove typically are retained on the glassy liquid crystalline films for months. A further advantage of the imaging masters formed in this manner is that they are reusable. Thus, as has been previously discussed the images may be conveniently removed from the imaging members by reprocessing them according to the glassy cholesteric liquid crystalline forming process and subsequently utilized again according to the flash imaging method.

It should be noted that the invention has been found to be operative through experimentation and inaccuracy in the theoretical operation thereof as described is not to be construed as limiting of the invention.

The invention will now be further described with respect to specific preferred embodiments by way of Examples, it being understood that these are intended to be illustrative only and the invention is not limited to the conditions, procedures, materials, etc. specified therein. All parts and percentages recited in the Examples are by weight unless otherwise indicated.

EXAMPLE I

A thin film, approximately 1-2 mils thick, a dicholesteryl carbonate (available from Eastman Organic Chemicals) is spread on a glass slide. The glass slide is then placed on a hot plate and heated until the temperature of the discholesteryl carbonate is above its isotropic transition temperature which is about 220°C. At this point the material has a clear water-like appearance.

The slide is then removed from the hot plate and allowed to cool in air until the temperature of the dicholesteryl carbonate is within its cholesteric mesomorphic temperature range which is from about 175°C. to about 220°C. When the material is in this temperature range it becomes cloudy in appearance. The dicolesteryl carbonate is then disturbed by applying a shearing force to the surface of the film with a second glass plate. The glass plate carrying the dicholesteryl chloride film is then removed to a relatively cool surface and allowed to cool to room temperature. A hard glassy dicholesteryl carbonate film which has a clear colorless appearance is obtained.

EXAMPLE II

A thin film of cholesteryl cinnamate (available from Eastman Organic Chemicals) is spread on a glass slide. The glass slide is then placed on a hot plate and heated until the temperature of the cholesteryl cinnamate is above its isotropic transition temperature which is about 214°C.

The slide is them removed from the hot plate and cooled in air until the cholesteryl cinnamate film reflects a green color. At this point the cholesteryl cinnamate is disturbed by applying a shearing force to the surface of the film with a second glass plate. The slide carrying the cholesteryl cinnamate film is then placed on a hot plate adjusted to a temperature less than the isotropic transition temperature but greater than the crystallization point which is about 141°C. and allowed to come to equilibrium with the second temperature which is about 150°C. The plate is then removed to a cool surface and the cholesteryl cinnamate film is cooled relatively rapidly. A hard glassy film is obtained.

EXAMPLE III

The procedure described in Example I is repeated using cholesteryl propynyl carbonate (available from Eastman Organic Chemicals). Cholesteryl propynyl carbonate has a crystallization point of about 59°C. and an isotropic transition temperature of about 90°C.

Vitrification occurs in about 2 hours after the material has cooled to room temperature.

EXAMPLE IV

The procesure described in Example I is repeated using p-nitro cholesteryl benzoate (available from Pfaltz & Bauer, Flushing, New York). This substance has a cholesteric mesomorphic temperature range of from about 191°C. to about 265°C. A similar result is obtained.

EXAMPLE V

An optically negative liquid crystalline composition is prepared by mixing together approximately equal parts of dicholesteryl carbonate and cholesterol. The composition is treated in accordance with the procedure described in Example I. A glassy liquid crystal film having a blue color is obtained.

EXAMPLE VI

An optically negative liquid crystalline composition is prepared by mixing together approximately equal parts of p-nitro cholesteryl benzoate and cholesteryl propynyl carbonate. The composition is treated in accordance with the procedure described in Example I. A glassy liquid crystal film having a green color is obtained.

While the invention has been described with respect to certain embodiments thereof it is not intended to be limited thereto but rather it will be appreciated by those skilled in the art that variations and modifications are possible which are within the spirit of the invention and the scope of the claims.

What is claimed is:

1. A process for forming glassy cholesteric liquid crystalline materials comprising the steps of:
   a. heating a cholesteric liquid crystalline substance above its isotropic transition temperature,
   b. cooling said substance to some critical temperature within its cholesteric mesomorphic temperature range,
   c. disturbing said substance while it is at said critical temperature; and
   d. cooling said substance relatively rapidly until it obtains a glassy, or substantially solid state.

2. The process as defined in claim 1 wherein step (c) is carried out by applying an electric field to said substance.

3. The process as defined in claim 1 wherein step (c) is carried out by applying a shearing force to the surface of said substance.

4. The process as defined in claim 1 wherein said cholesteric liquid crystalline substance is chosen from the group consisting of: esters derived from reactions of cholesterol and carboxylic acids; dicholesteryl compounds; double and triple bonded carbonates of cholesterol; and mixtures thereof.

5. The process as defined in claim 1 wherein said cholesteric liquid crystalline substance is chosen from the group consisting of cholesteryl cinnamate, dicholesteryl carbonate, cholesteryl propynyl carbonate and p-nitro cholesteryl benzoate.

6. The process as defined in claim 1 wherein carbon black is added to said cholesteric liquid crystalline substance.

7. The process as defined in claim 1 and further including a step (e) of subjecting said glassy cholesteric liquid crystalline material to uniform exposure to radiation which is absorbed by said material, wherein the energy provided by said radiation causes rapid heating of said material.

8. A glassy cholesteric liquid crystalline material prepared by the process of claim 1.

9. A glassy cholesteric liquid crystalline material prepared by the process of claim 3.

10. A glassy cholesteric liquid crystalline material prepared by the process of claim 5.

11. The process as defined in claim 7 wherein said radiation comprises ultraviolet radiation.

12. The process as defined in claim 1 wherein said cholesteric liquid crystalline substance is provided as a film on a substrate, said film having a thickness of from about 1 to about 10 mils.

13. An imaging method comprising providing an imaging member comprising a film of glassy cholesteric liquid crystalline material prepared by the process of claim 1 and exposing said imaging member to an imagewise pattern of energy which is absorbed by said material and causes rapid heating of said material whereby an image is formed on the imaging member.

14. The imaging method as defined in claim 13 wherein said imaging member comprises said glassy cholesteric liquid crystalline film disposed on a substrate.

15. The imaging method as defined in claim 13 wherein said energy is provided by an ultraviolet light source.

16. The imaging method as defined in claim 13 wherein said glassy cholesteric liquid crystalline material is chosen from the group consisting of: esters derived from reactions of cholesterol and carboxylic acids; dicholesteryl compounds; double and triple bonded carbonates of cholesterol; and mixtures thereof.

17. The imaging method as defined in claim 13 wherein said glassy cholesteric liquid crystalline material is chosen from the group consisting of cholesteryl cinnamate, dicholesteryl carbonate, cholesteryl propynyl carbonate and p-nitro cholesteryl benzoate.

18. The imaging method as defined in claim 13 wherein said glassy cholesteric liquid crystalline film has carbon black particles incorporated therein.

19. The imaging method as defined in claim 14 wherein said glassy cholesteric liquid crystalline film has a thickness of from about 1 to about 10 mils.

20. The imaging method as defined in claim 13 and further including the step of erasing said image.

21. The imaging method as defined in claim 20 wherein said step of erasing is carried out by heating said glassy cholesteric liquid crystalline material above its isotropic transition temperature.

22. The imaging method as defined in claim 20 wherein said step of erasing comprises heating said glassy cholesteric liquid crystalline material above its isotropic transition temperature, cooling said material to some critical temperature within its cholesteric mesomorphic temperature range,
disturbing said material while it is at said critical temperature, and
cooling said material relatively rapidly until it obtains a glassy, or substantially solid state.

* * * * *